March 22, 1966  R. BERTSCHI  3,242,417
AUTOMATIC POWER CONTROL FOR HIGH FREQUENCY ALTERNATORS
Filed Sept. 14, 1962  2 Sheets-Sheet 1
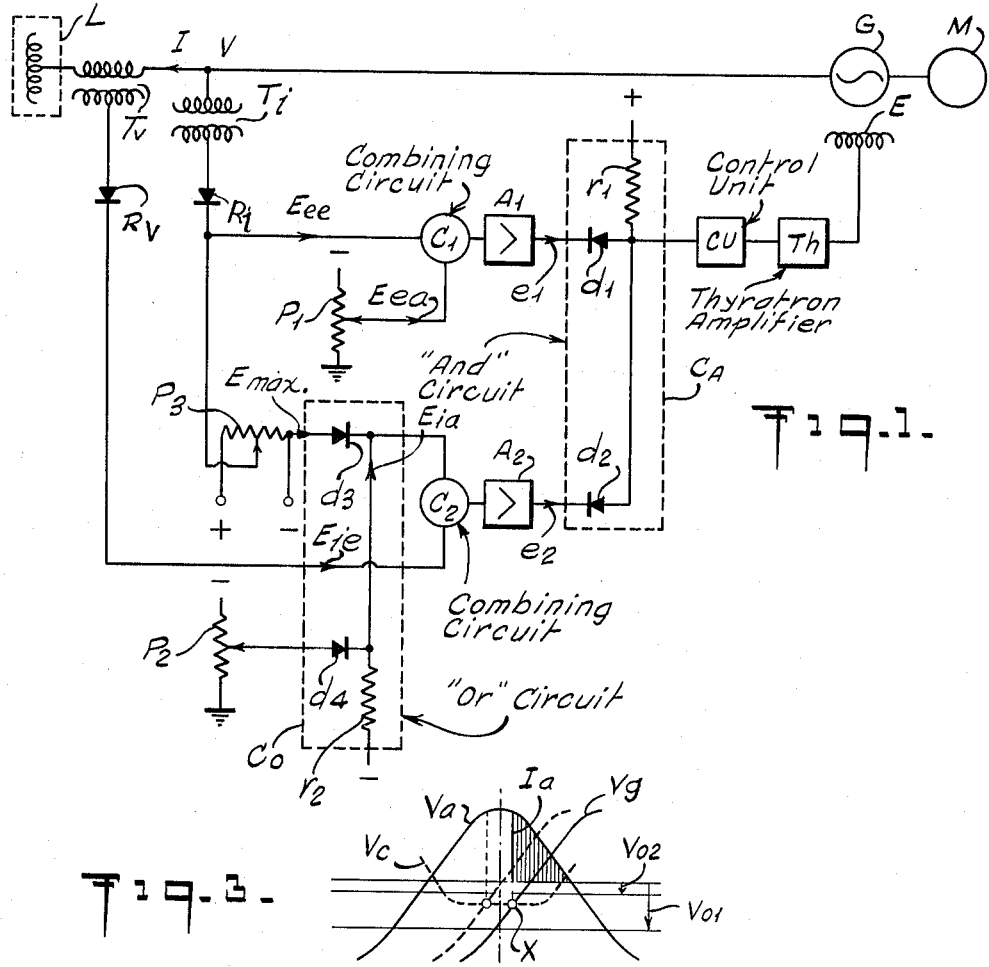
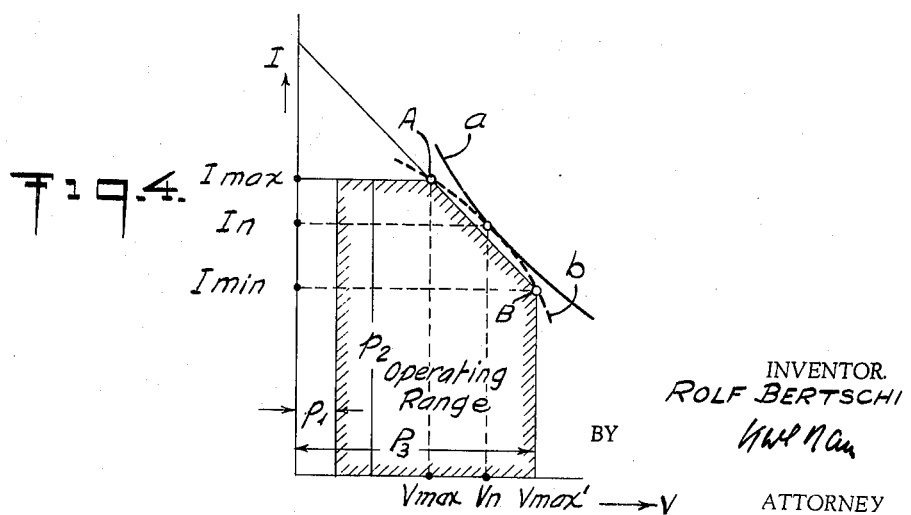
INVENTOR.
ROLF BERTSCHI
BY
ATTORNEY

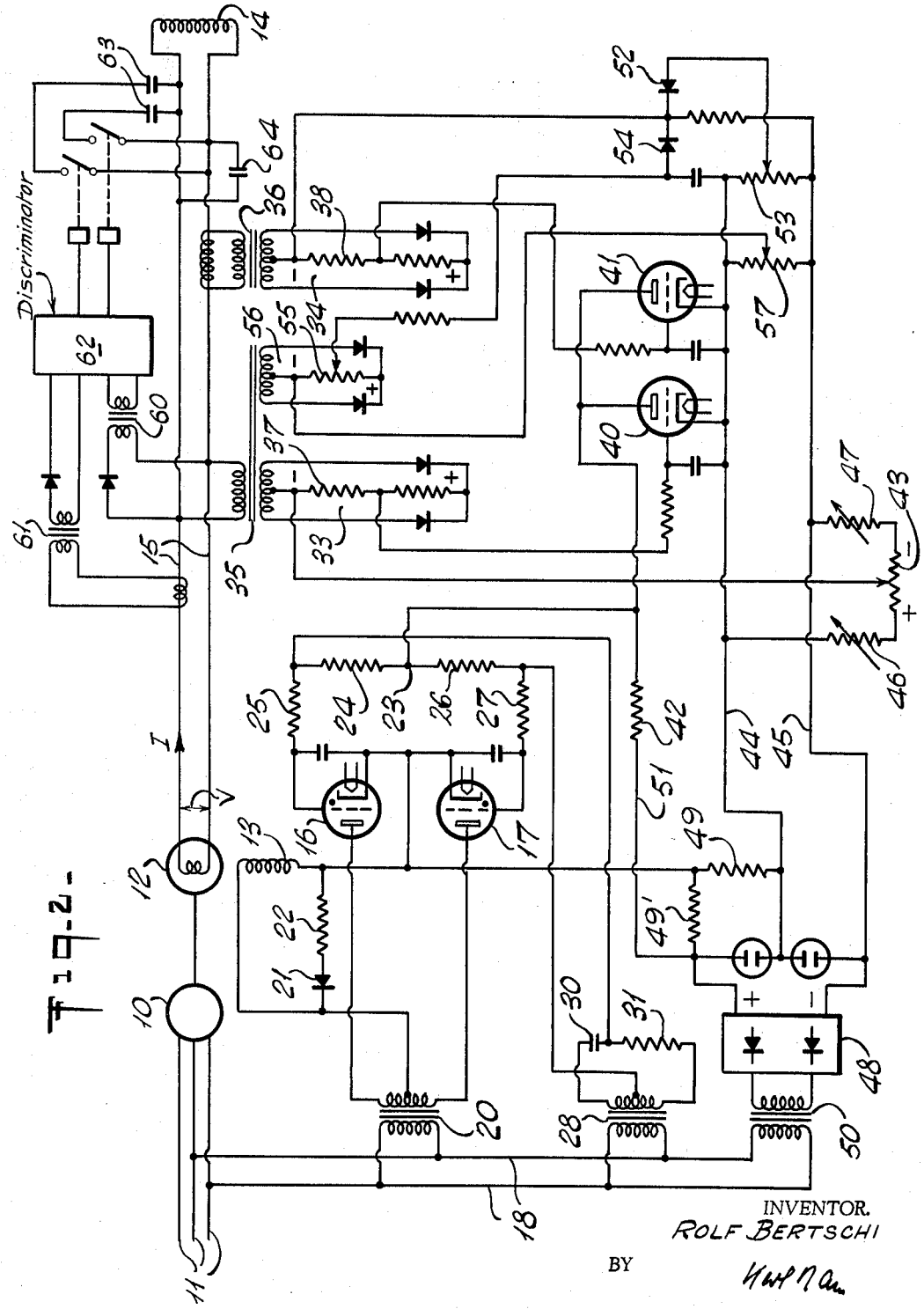

United States Patent Office 3,242,417
Patented Mar. 22, 1966

3,242,417
AUTOMATIC POWER CONTROL FOR HIGH
FREQUENCY ALTERNATORS
Rolf Bertschi, Zurich, Switzerland, assignor to Aktiengesellschaft Brown, Boveri & Cie, Baden, Switzerland
Filed Sept. 14, 1962, Ser. No. 223,791
8 Claims. (Cl. 322—25)

The present invention relates to a system for automatically maintaining a constant power output of an electric alternator, more particularly a high frequency generator serving to supply a varying impedance load, such as the heating coil of an inductive melting furnace or the like consuming device. The term "high frequency" used for purposes of the present specification is intended to comprise frequencies above the standard power frequency, that is, including those sometimes referred to medium frequencies, or frequencies capable of generation by means of rotary generators or alternators.

An important object of the invention is the provision of an automatic regulating system for a high frequency alternator feeding a varying load or consumer, whereby the alternator is utilized as an impedance matching device, to maintain a substantially constant output power within a predetermined range of active load impedance changes during operation, such as an inductive melting, or the like operating cycle.

Another object of the invention is the provision of an automatic regulator for high frequency alternators adapted to maintain a substantially constant rated or maximum power output, substantially independently of active load impedance variations within relatively wide limits during operation.

High frequency generators as used for feeding induction melting and the like variable load devices are characterized by the fact that they can operate below the nominal or rated voltage at increased output current, on the one hand, and above the nominal or rated voltage at decreased current output, on the other hand, in such a manner as to enable the maintenance of a substantially constant power output, that is, within the range of permissible or maximum current, on the one hand, and an excess or maximum voltage, on the other hand, in order to prevent overheating and insulation and other problems and defects, respectively. As a consequence, it is possible to operate a medium or high frequency alternator at full load over a relatively wide range of active load impedance changes, in the interest of achieving maximum operating efficiency and economy.

The aforementioned benefits of this favorable feature of high frequency alternators may be realized and utilized to their fullest extent by means of the automatic power or impedance matching control according to the present invention in conjunction with auxiliary control means provided to prevent dangerous overloading or excessive generator voltage rise, respectively.

Accordingly, another object of the invention is the provision, in conjunction with an automatic power regulator for high frequency alternators of the type referred to, of means to limit the output current of the alternator to a predetermined or maximum current at reduced voltage, on the one hand, and to limit the generator voltage to a safe limit at reduced current, on the other hand, in an effort to prevent excessive heating or temperature rise of the generator, or to effect the insulation of the generator and the devices or circuit elements associated therewith, respectively.

Another object of the invention is the provision of an automatic power regulator for high frequency alternators of the type referred to embodying adjustable excess current and excess voltage control or cut-out means, to maintain the automatic power control within the limits of safe or permissible generator temperature and to prevent damage to the insulation of the generator and associated devices, respectively.

Yet another object of the invention is the provision of an automatic power regulator for high frequency alternators of the type referred to which is both simple and economical in design and construction; which can be readily adjusted to a desired rated operating voltage or power, as well as for a required maximum load current and voltage, to suit existing operating conditions and requirements; and which will be both reliable and stable in operation.

The invention, both as to its ancillary objects and novel aspects, will be better understood from the following detailed description of a preferred practical embodiment, taken in conjunction with the acompanying drawings forming part of this specification and in which:

FIG. 1 is a schematic circuit diagram showing the basic lay-out of an automatic power control system designed for high frequency alternators constructed in accordance with the principles of the invention;

FIG. 2 is a wiring diagram showing in greater detail a preferred power control system for carrying into effect the invention;

FIG. 3 is a theoretical diagram explanatory of the thyratron power amplifier controlling the exciting current of the alternator in FIG. 2; and FIG. 4 is a graph explanatory of the function and operation of the power control regulator and safety control devices according to the invention.

Like reference characters are used to denote like parts and devices in the different views of the drawings.

With the foregoing objects in view, the invention involves generally the provision of automatic voltage regulator means comprising a first comparator circuit for producing a voltage-responsive differential signal voltage between the existing or actual generator voltage and a preferably adjustable standard or reference voltage representing an assigned nominal output voltage of the generator. The resultant differential signal or voltage serves to control the generator field or exciting current and, in turn, the induced or generated voltage, in such a manner as to normally tend to maintain the terminal or output voltage of the generator at a substantially constant value determined by said reference voltage, in a manner well known in connection with automatic generator voltage regulator systems according to the prior art.

In order to prevent both the generator load current and output voltage from exceeding predetermined permissible upper limits and in order to effect an automatic power regulation, there is further provided in a system aforedescribed safety or automatic cut-out means effective in suppressing or disabling the automatic voltage regulation whenever the current or voltage exceed a predetermined upper limit or maximum, the latter being advantageously adjustable to suit existing operating conditions and requirements. For this purpose, a current-responsive control signal controlling the automatic regulation is comprised of or formed by the differential between a preferably adjustable further comparison or reference voltage, proportional to an assigned maximum or safe generator load current, and a voltage derived from and representing the actual or existing load current supplied by the generator. As a consequence, as long as the load current remains below the permissible or assigned maximum value, the output of the current regulator will be at its maximum, whereby a subsequent "AND"-circuit or gate, having as inputs both differentials between the generator voltage and current-responsive voltages and their respective reference voltages, acts to cause only the signal voltage of the voltage regulator to be effective on the field excitation current during this operating condition of the system. On the other hand, as soon as the actual load current exceeds the assigned maximum current, the resultant differential control signal or voltage will become zero, whereby to suppress one of the signals of the "AND" circuit and, in turn, the effectiveness of the automatic regulation. A further current rise is thus prevented, as will become more apparent from the following.

The aforedescribed current and voltage regulator is utilized in accordance with the improvements of the present invention to limit or to maintain constant the maximum output power of the generator within a predetermined operating range and independently of load resistance changes, by causing a progressively decreasing effective assigned current to be applied to the input of the combining circuit serving to produce the differential between the voltages proportional to the assigned and actual generator currents, respectively. This aim is achieved by the provision of an "OR"-circuit having as inputs a signal voltage proportional to the aforementioned assigned current, on the one hand, and the differential between a further reference or assigned voltage proportional to a predetermined maximum generator output power and a signal voltage proportional to the actual generator output voltage, on the other hand. The effect of the "OR"-circuit is to cause the smaller one of said input voltages to be effective in series and opposition with the signal voltage proportional to the actual load current, in such a manner as to maintain a substantially constant output power and to suppress the regulation upon the generator producing a maximum rated output voltage beyond said assigned or nominal voltage, in the manner as will become further apparent as the following description proceeds.

In the foregoing, it has been assumed that the load impedance changes being matched with the generator impedance are of a purely resistive character. If the load, in addition to the active impedance changes, is furthermore subject to reactive impedance variations, the latter may be compensated by means of an automatic power factor control system, to maintain a constant power factor during operation.

Referring more particularly to FIG. 1, the output voltage V of the medium or high frequency rotary generator or alternator G being driven by a suitable prime mover, such as a synchronous motor M, is adjusted in a known manner by the current flowing in the exciting or field winding E. The exciting current, in the example shown, is supplied by the output of a thyratron power amplifier T$h$ and controlled by the grid control device or unit CU energized by an input or control voltage produced in the manner described in detail hereafter. The generator G serves to feed a variable impedance load L, such as the heating coil of an inductive melting furnace or equivalent consuming device.

In order to generate the input voltage for the thyratron amplifier, to maintain a constant maximum power output of the alternator G in accordance with the underlying principle of the invention, there is at first produced a pair of auxiliary control signals or direct current signal voltages $E_{ee}$ and $E_{ie}$, being proportional to the existing or actual generator voltage V and to the actual load or output current I, by means of a voltage transformer $T_v$ and a current transformer $T_i$ in conjunction with rectifiers $R_v$ and $R_i$, respectively. The regulating system proper operates through two parallel circuits or paths forming an "AND" circuit or gate $C_A$ and indicated by a pair of rectifiers $d_1$ and $d_2$ and a resistor $r_1$ in the drawing. The input signals of the "AND" circuit consist of a pair of differential signals $e_1$ and $e_2$ between the signal voltages $E_{ee}$ and $E_{ie}$ and a pair of assigned and preferably selectable reference voltages $E_{ea}$ and $E_{ia}$ representing an assigned nominal generator voltage and a permissible or maximum load current, respectively, said reference voltages being provided, in the example shown, by a pair of potentiometric voltage dividers $P_1$ and $P_2$, respectively.

The combining circuits of the respective pairs of signals $E_{ee}$, $E_{ea}$ and $E_{ie}$, $E_{ia}$ are shown schematically at $C_1$ and $C_2$ in the drawing. The differential output signals $e_1$ and $e_2$ of the combining circuits, after suitable amplification by means of amplifiers $A_1$ and $A_2$, are applied to the inputs of the "AND" circuit $C_A$ the output of which serves to excite the control unit CU of the thyratron amplifier T$h$.

The effect of the differential signal $e_1$ is to control the exciting current in the winding E in dependence upon changes of the output voltage V in a manner to normally tend to maintain said voltage at a constant value determined by the adjusting position of the potentiometer $P_1$, corresponding to the assigned nominal generator voltage, by automatically increasing the exciting current as a result of a decrease of the voltage V or an increase of the current I, and vice versa, in a manner well understood.

Disregarding temporarily the presence of the "OR" circuit $C_0$, indicated by the rectifiers $d_3$ and $d_4$ and resistor $r_2$, as well as the potentiometer $P_3$, the automatic voltage regulation aforedescribed is rendered dependent, according to the present invention, upon the differential signal $e_2$ between $E_{ia}$ and $E_{ie}$ through the action of the "AND" circuit $C_A$, that is, regulation of the exciting current through E by the control unit CU and thyratron amplifier T$h$ will be possible only if the load current I remains below the selected maximum determined by the adjustment of the potentiometer $P_2$, that is, with a signal being applied to both inputs of the "AND" circuit to result in an effective output or control. As soon as the signal $E_{ie}$ approaches or equals the signal $E_{ia}$, the output of the combining circuit $C_2$ becomes zero, thus suppressing the output of the "AND" circuit acting as a gate interrupting the regulation, to thereby prevent a current rise beyond the safe pre-selected value. In order to utilize the same regulation to limit and maintain constant the maximum generator power, the signal voltage $E_{ia}$ representing the assigned generator current is effectively reduced by the action of the "OR"-circuit $C_0$ in proportion as the generator voltage increases beyond a predetermined value $V_{max}$, FIG. 4, with increasing generator power output. For this purpose, there is applied to the "OR"-circuit, having its output applied in opposition to the signal voltage $E_{ie}$, aside from the fixed or assigned voltage $E_{ia}$, the difference between a further assigned voltage $E_{max}$ supplied by the potentiometer $P_3$ and the actual generator signal voltage $E_{ee}$, said difference being represented by the line A–B in FIG. 4. The voltage $E_{max}$ representing the maximum output power to be held constant is preferably adjustable for adapting the power control to existing conditions or requirements. Since the "OR"-circuit allows only the absolutely smaller one of its input voltages to be effective in producing an output signal, the maximum power of the generator will be effectively limited and maintained substantially constant within the voltage range $V_{max}$–$V_{max}'$.

Referring to FIG. 2, the numeral 10 represents a synchronous motor fed from a three-phase network 11 and driving the medium or high frequency alternator 12 having an exciting or field winding 13 and serving to supply the variable impedance load 14 through a pair of supply lines 15, said load being subject to both active and reactive impedance changes during operation. The field winding 13 is excited by a double-wave rectifier comprising a pair of thyratron tubes 16 and 17 or equivalent controlled rectifiers, such solid state or silicon controlled rectifiers, said tubes being supplied with anode current from one phase or line 18 of the network 11 through a transformer 20. The exciting winding 13 is connected in the conventional manner between the center point of the secondary of the transformer 20 and the cathodes of the tubes 16 and 17. Winding 13 may be by-passed by an excess voltage arrester, such as in the form of a rectifier 21 in series with a resistor 22, as shown in the example illustrated.

The output current of the thyratrons exciting the field winding 13 is adjusted, in the example shown, by and in response to a varying direct current signal or control voltage being applied to the grids of the tubes by way of the symmetry point 23 established by means of two pairs of series grid resistors 24, 25 and 26, 27, respectively, the control as shown being known as vertical thyratron grid control, to effect average anode current changes proportional to the varying grid control signal or voltage. For the latter purpose, the grids of the tubes are additionally biased by an A.C. voltage $V_g$ being displaced by a 90° or quadrature phase angle relative to the anode voltage $V_a$, as indicated in the explanatory diagram of FIG. 3 showing one half cycle of the voltage on a time base axis or ordinate. In the example illustrated, the A.C. grid voltage is applied from the line 18 through a further transformer 28 and a quadrature phase-shift device or circuit in the form of an RC network comprised of a capacitor 30 and series resistor 31 and being connected across the secondary winding of the transformer 28. With the center point of the transformer secondary being connected to the grid of the tube 17 through resistor 27 and with the junction of the capacitor 30 and resistor 31 being connected to the grid of the tube 16 through resistor 25, the A.C. grid voltages of the tubes will be in phase opposition relative to one another and in quadrature phase relation to the anode voltage $V_a$, whereby to effect an anode current control in the same sense during both the positive and negative supply current alternations.

Referring further to FIG. 3, the curve $V_c$ represents the critical or breakdown grid voltage of the thyratrons for the corresponding anode voltages $V_a$, wherefrom it is seen that by shifting the A.C. grid voltage $V_g$, for instance, from the full to the dotted line as shown in the drawing, the firing or breakdown point, being determined by the intersection X of the curves $V_c$ and $V_g$, may be displaced in such a manner as to adjust the timing or length of the anode current pulses $I_a$ during each half cycle, to thereby result in a corresponding variation of the average anode current and, in turn, of the generator exciting field. The shifting of the curve $V_g$ is effected by varying the negative direct current grid control voltage $V_0$, whereby to displace the firing point X in the manner pointed out. More particularly, a reduction of the grid control voltage, say from $V_{01}$ to $V_{02}$, will result in the anode current being increased, and vice versa, within a predetermined operating range.

The differential voltages or signals, representing the deviation of the actual generator voltage from the assigned or nominal voltage, and the deviation of the actual load current from the assigned maximum current, are produced by means of a pair of rectifier circuits 33 and 34 being connected to the secondaries of the voltage and current transformers 35 and 36 and including output or load resistors 37 and 38, respectively, whereby the latter supply a pair of control signals corresponding to the signals or voltages $E_{ee}$ and $E_{ie}$, respectively, of FIG. 1.

The "AND" circuit or network in FIG. 2 takes the form of a pair of triode vacuum tubes 40 and 41 having their cathode-anode paths connected in parallel and operating upon a common output or load resistor 42, to generate the direct current control potential for the thyratrons 16 and 17 by connection of the anodes of the tubes 40 and 41 to point 23. The reference voltage representing the assigned nominal or operating voltage, that is, the voltage $E_{ea}$ according to FIG. 1, is produced by means of an adjustable potentiometer 43, corresponding to the potentiometer $P_1$ of FIG. 1 and having a variable tap connected to one end of the resistor 33 which has its opposite end connected to the grid of the tube 40. The free ends of the potentiometer 43 are connected to a source of constant voltage across lines 44 and 45 through a pair of further adjustable resistors 46 and 47, respectively, the purpose of which will be described presently. The constant direct current voltage across lines 44 and 45 is supplied by a further rectifier power supply 48 energized from the line 18 through a transformer 50. Rectifier 48 further serves to provide the anode potential for the tubes 40 and 41 through supply line 51, line 44 being connected to the cathodes of the tubes in the manner shown.

One end of resistor 38 supplying the current-responsive control signal or voltage, corresponding to signal $E_{ie}$ of FIG. 1, is connected to the grid of the tube 41, while the opposite end of said resistor is connected to the cathode of said tube through a pair of parallel paths forming an "OR" circuit, one of the paths of said "OR" circuit comprising a rectifier 52 in series with an adjustable portion of a potentiometer 53 connected across the lines 44 and 45 and serving for the adjustment of the maximum load current, that is, corresponding to the potentiometer $P_2$ of FIG. 1, while the second path of the "OR" circuit is comprised of a rectifier 54 in series with an adjustable portion of the output resistor 55 of a further rectifier arrangement 56 connected to a tertiary winding of the voltage transformer 35, and a variable portion of a further potentiometer 57, also connected across lines 44, 45 and serving to adjust the maximum permissible generator power, corresponding to the potentiometer $P_3$ of FIG. 1.

The thyratron bias voltage is provided by a pair of voltage dividers both being connected across lines 44 and 51 and comprising a pair of fixed resistors 49 and 49', on the one hand, and the load resistor 42 and the cathode-anode paths of the tubes 40 and 41, on the other hand, the cathodes of the thyratrons being connected to the junction between the resistors 49 and 49' and the thyratron grids being connected to the anodes of the tubes 40 and 41.

There is furthermore shown diagrammatically in FIG. 2 an arrangement for the automatic control of the power factor, to compensate for the inductive impedance changes of the load 14. For this purpose, the rectified output signals of a further pair of voltage and current transformers 60 and 61 are compared in a phase discriminator 62, to produce a signal being proportional to the $\cos \varphi$ between current and voltage and serving to control, after suitable amplification, a polarized relay and step switch or the like for connecting variable numbers of a bank of capacitors 63 in parallel to the main compensating capacitor 64, in a manner as to maintain a desired, including unity, power factor, independently of the load reactance variations during operation.

In operation, upon initially displacing the potentiometer contact 43 to the extreme left in the example shown, the variable resistor 46 is adjusted to set the anode current of the tube 40 such as to result in the grids of the thyratrons 16 and 17 being just biased below cut-off. The potentiometer 43 is then set to the desired operating or nominal generator voltage by moving the contact to the position shown in the drawing. This will result in the temporary cut-off of the tube 40 and, in turn, in the firing of the thyratrons, whereby to excite the field winding 13 and causing the generated voltage to build up to the selected value, that is, until the negative bias of the tube 40 provided by the potentiometer 43 is balanced by the positive bias voltage provided by the resistor 33. As a consequence, the tube 40 again starts to conduct, resulting in the cut-off of the thyratrons and so on, in such a manner as to cause the voltage V to fluctuate closely about the nominal or selected value. When the current I reaches the assigned maximum, determined by the adjustment of the potentiometer 53, the output current of the tube 40 assumes a value to result in a negative bias of the thyratrons beyond the effective operating or control range, thereby to interrupt or disable the regulation and to protect the generator against overload.

Expressed in other words, the tube 41 is caused to draw a maximum current, to cut off the thyratrons upon the normally negative bias supplied by potentiometer 53 being balanced by the positive bias supplied by resistor 38. The same conditions will prevail if the differential of the voltages produced by resistor 55 on potentiometer 57 balances the voltage produced by resistor 38, now being at its minimum, thus again disabling the regulation and protecting the generator and associated devices against excess power. Only one of the parallel branches including the rectifiers 52, 54, that is, the branch providing the relatively smaller control voltage, will be effective at a time in exciting the grid of the tube 41 in conjunction with the voltage supplied by resistor 38, whereby to result in the constant current control to transfer to a decreasing current control upon the generator assuming a predetermined power output corresponding a maximum voltage ($V_{max}$, FIG. 4) set by the potentiometer 57 and, in turn, in the maintenance of said maximum power within a predetermined operating range of the generator ($V_{max}$–$V_{max}'$, FIG. 4).

FIG. 4 is a graph representing the current I as a function of the output voltage V of the generator and illustrating the operating conditions of a power control system described in the foregoing. Curve $a$ having the form of a hyperbola represents the relation between the voltage V and current I for constant power output, while curve $b$ indicates the limits of the permissible generator temperature. The adjustment for the maximum current $I_{max}$ and maximum voltage $V_{max}$ in relation to the rated nominal voltage $V_n$ and current $I_n$ is such as to cause the operating range A–B to coincide with a practically straight section of the curves $a$ and $b$. This diagram also shows the effect of the adjustment of the potentiometers $P_2$ and $P_3$, corresponding to items 53 and 57 of FIG. 2. Control of potentiometer 55 results in variation of the inclination of the section A–B, whereby to enable the preselection of all the operating parameters necessary for achieving optimum effects and results under varying operating conditions and requirements.

More particularly, the negative bias of tube 41 by the voltage across both 53 and 57 is normally blocked by the rectifiers 52 and 54. As the current I increases and exceeds its assigned maximum value $I_{max}$ with the voltage being held constant at the assigned nominal value by the automatic voltage regulation, the effectiveness of the latter is suppressed by the automatic current regulator by the voltage derived from 38 exceeding the voltage derived from 53 and rendering the tube conductive. With the generator voltage now increasing with increasing output power, the bias voltage derived from 57 is more and more counterbalanced by the voltage derived from 55 until reaching a point where it becomes less than the voltage supplied by 53. Control is thus shifted from the grid circuit containing 53 to the grid circuit containing 57, whereby to result in an effective reduction of the assigned grid voltage or load current, respectively, with increasing voltage across 55. As a consequence, the load current is reduced beginning at point A, FIG. 4, to result in a substantially constant maximum power output of the generator. This operation is continued during a predetermined voltage range $V_{max}$–$V_{max}'$, the latter being determined by the voltage derived from 38, decreasing with decreasing current, balancing the differential between the voltages derived from 55 and 57, to result in a final suppression of the regulation at point B of the operating range.

In the foregoing the invention has been described with reference to a specific illustrative device. It will be evident, however, that variations and modifications, as well as the substitution of equivalent elements and devices for those shown and disclosed herein, may be made without departing from the broader scope and spirit of the invention as set forth in the appended claims. The specification and drawings are accordingly to be regarded in an illustrative rather than in a restrictive sense.

I claim:

1. In a rotary high frequency generator having an exciting winding and a generating winding feeding a load subject to substantial impedance changes during operation, a control system comprising in combination means to produce a first signal voltage proportional to the output voltage of said generator, means to produce a first reference voltage representing an assigned output voltage of said generator, first automatic control means to vary the current through said exciting winding in response to the differential between said signal and reference voltages, to maintain the generator output voltage at a value substantially equal to said assigned voltage, second automatic control means having an input circuit and effective to disable said first control means by a predetermined control voltage applied to said input circuit, means to produce a second signal voltage proportional to the load current of said generator, means to produce a second reference voltage representing an assigned maximum load current of said generator, means to produce a third reference voltage representing an assigned maximum output power of said generator, an OR-circuit having a first and a second input branch in parallel to one another and an output branch in series with said input branches and the input circuit of said second automatic control means, means to apply said second signal voltage to said output branch, means to apply said second reference voltage to said first input branch, and means to apply the differential between said third reference voltage and said first signal voltage to said second input branch, whereby said OR-circuit control said second control means to first maintain said maximum output current over a predetermined generator operating range and to thereafter maintain said maximum output power over a predetermined range following said first operating range.

2. In a power control system as claimed in claim 1, said load being subject to both active and reactive impedance changes, and additional automatic control means to maintain a substantially constant power factor of said load.

3. In a power control system as claimed in claim 1, said load being subject to both active and reactive impedance changes, and additional automatic control means to maintain a substantially unity power factor of said load.

4. In combination with a rotary high frequency generator having an exciting winding and a generating winding feeding a load subject to substantial resistance changes during operation, a power regulator system comprising control means to vary the current through said winding, means to produce a first and a second direct current signal voltage proportional, respectively, to the actual output voltage of and to the actual load current supplied by said generator, means to produce a first reference voltage representing an assigned nominal output voltage of said generator, means to produce a first differential voltage between said first reference and said first signal voltages, further means to produce a second and third reference voltage proportional, respectively, to an assigned maximum load current and an assigned maximum output power of said generator, further means to produce a second differential voltage between said third reference and said first signal voltages, a combining circuit comprising means to produce a first and a second space discharge stream in parallel to one another and having a common output energizing said control means, means to control said first discharge stream by said first differential voltage, to increase the generator output voltage with increasing load current, and vice versa, to normally maintain a substantially constant output voltage equal to said nominal voltage, a control circuit for said second discharge stream, said second discharge stream adapted to disable the control by said first stream upon a predetermined control voltage being applied to said control circuit, an OR-circuit having a first and a second input branch in parallel to one another and an output branch connected to said control circuit in series with said input branches, means to apply said second signal voltage to said output branch, means to apply said second reference voltage to said first input branch, and further means to apply said second differential voltage to said second input branch, whereby said OR-circuit is effective in controlling said second control means, to maintain said maximum output current over a first predetermined generator operating range of increasing generator output voltage and to maintain said output power over a second range following said first operating range.

5. In combination with a rotary high frequency generator having an exciting winding and a generating winding feeding a load subject to substantial resistance changes during operation, a power control system comprising a controlled rectifier having an input and an output feeding said winding, means to produce a first and a second direct current signal voltage proportional, respectively, to the actual output voltage of and to the actual load current supplied by said generator, further means to produce a first reference voltage representing an assigned nominal output voltage of said generator, means to produce a first differential voltage between said first reference and said first signal voltages, means to produce second and third reference voltages proportional, respectively, to an assigned maximum load current and an assigned maximum output power of said generator, means to produce a second differential voltage between said third reference voltage and said first signal voltage, a combining circuit comprising means to produce a first and a second space discharge stream in parallel and having separate control electrodes and a common output connected to the input of said rectifier, means to apply said first differential voltage to the control electrode of said first discharge stream, whereby to normally maintain the generator output voltage at a value equal to said nominal voltage, a pair of circuit paths in parallel each including a rectifier and being connected to the control electrode of said second discharge stream in series with said second signal voltage, one of said circuit paths including said second reference voltage and the other circuit path including said second differential voltage, the voltages of each said circuit paths being in opposition to said second signal voltage, whereby to maintain a substantially constant maximum output power of said generator within a range above said assigned nominal voltage and determined by said third reference voltage.

6. In combination with a rotary high frequency generator having an exciting winding and feeding a load subject to substantial impedance changes during operation, a power control system comprising means to produce a first and a second direct current signal voltage proportional, respectively, to the actual output voltage of and to the actual load current supplied by said generator, means to produce first, second and third reference voltages proportional, respectively, to an assigned nominal output voltage, an assigned maximum output current, and an assigned maximum output power of said generator, voltage regulator means to vary the exciting current through said winding by the differential between said first signal and said first reference voltages, to normally maintain the generator output voltage equal to said nominal voltage, current regulator means controlling said voltage regulator means in response to the differential between said second signal and said second reference voltages, to suppress the effectiveness of said voltage regulator means upon said load current exceeding said assigned current, and means operably associated with said current regulator means to decrease the effective value of said assigned current in proportion to the decrease of the differential between said first signal and said third reference voltages, to thereby maintain a substantially constant maximum output power of said generator within a predetermined effective voltage range above said assigned output voltage.

7. In combination with a rotary high frequency generator having an exciting winding and feeding a load subject to substantial active impedance changes during operation, a power regulator system comprising means to produce a first and a second direct current signal voltage proportional, respectively, to the actual output voltage of and to the actual load current supplied by said generator, means to produce first, second and third reference voltages proportional, respectively, to an assigned nominal output voltage, an assigned maximum output current and an assigned maximum output power of said generator, voltage regulator means to vary the exciting current through said winding in response to the differential between said first signal voltage and said first reference voltage, to normally maintain the generator output voltage equal to said assigned voltage, "OR"-circuit means having an output controlling said voltage regulator means and being effective in combining said second signal voltage with the smaller one of either of said second reference voltage or the differential between said third reference and first signal voltages, whereby to normally suppress the effectiveness of said voltage regulator means upon said second signal voltage approaching said second reference voltage and to effectively decrease said second reference voltage and to reduce the assigned output current with increasing power output of said generator, to thereby provide a substantially constant maximum power output within a predetermined effective voltage range above said assigned voltage.

8. In a rotary high frequency generator having an exciting winding and a generating winding feeding a load subject to substantial impedance changes during operation, a control system comprising first control means operative in varying the current through said exciting winding, to maintain the output voltage of said generator at an assigned nominal voltage, second control means operative in disabling said first control means by critical control voltage applied thereto, means to produce a signal control voltage proportional to the load current supplied by said generator, means to produce a reference voltage representing a maximum load current of said generator, means to control said second control means by the differential between said signal and reference voltages, whereby to maintain the generator load current at a regulated value corresponding to said maximum current by cooperation of said first and second control means, and third control means operative upon said generator assuming a predetermined maximum power output, to reduce said reference voltage and in turn the regulated load current in proportion as the generator voltage is increased, to thereby maintain said maximum generator output power over a predetermined voltage operating range above said nominal voltage.

References Cited by the Examiner
UNITED STATES PATENTS

| 2,057,490 | 10/1936 | Jenks | 322—20 |
| 2,119,406 | 5/1938 | Stratton | 322—25 |
| 2,604,619 | 7/1952 | Stone | 322—25 |

LLOYD McCOLLUM, *Primary Examiner.*